(12) United States Patent
Srnka et al.

(10) Patent No.: US 7,894,989 B2
(45) Date of Patent: Feb. 22, 2011

(54) METHOD FOR DETERMINING EARTH VERTICAL ELECTRICAL ANISOTROPY IN MARINE ELECTROMAGNETIC SURVEYS

(75) Inventors: Leonard J. Srnka, Bellaire, TX (US); Xinyou Lu, Missouri City, TX (US); Olivier M. Burtz, Houston, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 282 days.

(21) Appl. No.: 11/920,676

(22) PCT Filed: May 8, 2006

(86) PCT No.: PCT/US2006/017631

§ 371 (c)(1),
(2), (4) Date: Nov. 19, 2007

(87) PCT Pub. No.: WO2006/135510

PCT Pub. Date: Dec. 21, 2006

(65) Prior Publication Data

US 2009/0096457 A1 Apr. 16, 2009

Related U.S. Application Data

(60) Provisional application No. 60/688,841, filed on Jun. 9, 2005.

(51) Int. Cl.
*G01V 3/00* (2006.01)
*G01V 1/28* (2006.01)

(52) U.S. Cl. .............................. 702/2; 702/11; 702/38; 367/117; 367/106; 367/23; 324/329; 324/365

(58) Field of Classification Search ............... 702/1–13, 702/14, 38, 65, 189; 324/332–375, 323, 324/329; 343/719; 367/117, 106, 134, 21, 367/23, 15, 153, 141; 73/152.05, 152.06, 73/170.33, 170.29; 703/2, 5
See application file for complete search history.

(56) References Cited

U.S. PATENT DOCUMENTS 4,617,518 A 10/1986 Srnka .......................... 324/365

(Continued)

FOREIGN PATENT DOCUMENTS

EP 1309887 3/2004

(Continued)

OTHER PUBLICATIONS

Berdichevsky, M. N. et al. (1989) *Marine Deep Geoelectrics* (in Russian), Nauka, Moscow, 11 pgs.

(Continued)

*Primary Examiner*—Mohamed Charioui
*Assistant Examiner*—Ricky Ngon

(57) ABSTRACT

A method is disclosed for determining earth vertical electrical anisotropy from offshore electromagnetic survey measurements. The method requires both online and offline data, which includes at least one electromagnetic field component sensitive at least predominantly to vertical resistivity and another component sensitive at least predominantly to horizontal resistivity. Using a horizontal electric dipole source, online $E_Z$ and offline $H_Z$ measurements are preferred. For a horizontal magnetic dipole source, online $H_Z$ and offline $E_Z$ data are preferred. magnetotelluric data may be substituted for controlled source data sensitive to horizontal resistivity. Maxwell's equations are solved by forward modeling or by inversion, using resistivity models of the subsurface that are either isotropic or anisotropic.

30 Claims, 7 Drawing Sheets

U.S. PATENT DOCUMENTS

| | | | | |
|---|---|---|---|---|
| 4,827,404 | A | | 5/1989 | Barstow et al. |
| 5,777,476 | A | | 7/1998 | Papadopoulos et al. ..... 324/334 |
| 5,886,526 | A | * | 3/1999 | Wu ............................ 324/338 |
| 5,905,657 | A | | 5/1999 | Celniker ..................... 364/578 |
| 6,092,024 | A | * | 7/2000 | Wu ................................ 702/7 |
| 6,553,314 | B2 | * | 4/2003 | Kriegshauser et al. ......... 702/7 |
| 6,603,313 | B1 | * | 8/2003 | Srnka ........................ 324/354 |
| 6,684,385 | B1 | | 1/2004 | Bailey et al. |
| 6,950,748 | B2 | * | 9/2005 | Liu et al. ....................... 702/7 |
| 7,126,338 | B2 | * | 10/2006 | MacGregor et al. ......... 324/334 |
| 2002/0169589 | A1 | | 11/2002 | Banki et al. |
| 2003/0050759 | A1 | | 3/2003 | Srnka et al. .................... 703/5 |
| 2005/0049792 | A1 | * | 3/2005 | Yu et al. ........................ 702/7 |
| 2005/0086635 | A1 | | 4/2005 | Parikh et al. |
| 2007/0061078 | A1 | * | 3/2007 | Lu et al. ........................ 702/2 |

FOREIGN PATENT DOCUMENTS

| | | |
|---|---|---|
| GB | 2395583 | 5/2004 |
| WO | WO 01/04937 | 1/2001 |
| WO | WO 02/054332 | 7/2002 |
| WO | WO2004/008183 | 1/2004 |
| WO | WO2005/117326 | 12/2005 |
| WO | WO2006/052145 | 5/2006 |

OTHER PUBLICATIONS

Chave, et al. (1991) "Electrical Exploration Methods for the Seafloor," *Electromagnetic Methods in Applied Geophysics*, Chapter 2, pp. 931-966, Soc. Expl. Geophysics, Tulsa.

Edwards, et al. (1981) "On Measuring the Electrical Conductivity of the Oceanic Crust by a Modified Magnetometric Resistivity Method," *J. Geophys. Res.* 86.B12, pp. 11609-11615.

Ellingsrud, S. et al. (2002) "Remote Sensing of Hydrocarbon Layers by Seabed Logging (SBL): Results from a Cruise Offshore Angola," *The Leading Edge*, v. 21, pp. 972-982.

Golubev, N. et al. (1998) "Comparative Study of Land and Sea Bottom Geoelectric Anomalies," *Consortium for Electromagnetic Modeling and Inversion Annual Report*, pp. 175-217, U. Utah.

Kaufman, A. A. et al. (1981) *The Magnetotelluric Method*, pp. 478-484, Elsevier.

Kaufman, A. A. et al. (1983) *Frequency and Transient Soundings*, Elsevier, N.Y., pp. 257-284.

Keller, G. V. et al. (1966) *Electrical Methods in Geophysical Prospecting*, pp. 33-39, Pergamon.

Nekut, A. G. et al. (1989) "Petroleum Exploration using Controlled-Source Electromagnetic Methods," *Proc. of the IEEE*, New York, v. 77.2, pp. 338-362, XP000034906.

Sinha, M. C. (1999) *LITHOS Science Report*, vol. 1, pp. 95-101, Cambridge Univ.

Tompkins, M. J. (2004) "Effects of Vertical Anisotropy on Marine Active Source Electromagnetic Data and Inversions," paper presented at EAGE 65th Annual Convention, Paris, France (abstract E026), 4 pgs.

Zhdanov, M. S. et al. (1994) *The Geoelectrical Methods in Geophysical Exploration*, Elsevier, N.Y., pp. 119-124.

Zhdanov, M. S. et al. (2003) "Three-Dimensional Marine Magnetotellurics for Petroleum Exploration", *SEG 2003 Annual Meeting Expanded Abstracts*, (ER 1.8) pp. 541-544.

Cheesman, S. J. et al. (1987) "On the Theory of Sea-Floor Conductivity Mapping Using Transient Electromagnetic Systems," *Geophysics* 52, pp. 204-217.

Chlamtac, M. et al. (1981) The Electromagnetic Fields of a Horizontal Dipole Over a Vertically Inhomogeneous and Anisotropic Earth, *Geophysics*, v. 46, pp. 904-915.

Christensen, N. B. (2000) "Difficulties in Determining Electrical Anisotropy in Subsurface Investigations," *Geophys. Prospecting*, v. 48, pp. 1-9.

Constable, S. C. et al., (1998) "Marine Magnetotellurics for Petroleum Exploration Part 1: A Sea-Floor Equipment System," *Geophysics* 63, 816-825.

Edwards, R. N. et al. (1984) "Offshore Electrical Exploration of Sedimentary Basins: The Effects of Anisotropy in Horizontally Isotropic, Layered Media," *Geophysics*, v. 49, pp. 566-576.

Edwards, R. N. (1997) "On the Resource Evaluation of Marine Gas Hydrate Deposits Using Sea-Floor Transient Electric Dipole-Dipole Methods," *Geophysics*, v. 62, pp. 63-74.

Hoversten et al., (2000) "Marine Magnetotellurics for Base-of-Salt Mapping: Gulf of Mexico Field Test at the Gemini Structure," *Geophysics* 65, 1476-1488.

Jupp, D. L. P. et al. (1977) "Resolving Anisotropy in Layered Media by Joint Inversion," *Geophys. Prospecting*, v. 25, pp. 460-470.

Linde, N. et al. (2004) "Evidence of Electrical Anisotropy in Limestone Formations Using the RMT Technique," *Geophysics*, v. 69, pp. 909-916.

MacGregor, L. M. et al. (1999) "The Use of Marine Controlled Source Electromagnetic Sounding for Sub-Basalt Exploration," paper presented at the EAGE Annual Convention, Helsinki, Finland (abstract 4-08), 4 pgs.

Negi, J. G. et al. (1989) *Anisotropy in Geoelectromagnetism*, Elsevier, N.Y., 19 pages.

Newman, G. A. et al. (1999) "3-D Electromagnetic Modeling and Inversion on Massively Parallel Computers," *Three-Dimensional Electromagnetics: Soc. Expl. Geophysicists*, Dev. No. 7 Tulsa, 24 pages.

Watson, K. A. et al. (1999) "Differentiating Anisotropy and Lateral Effects Using Azimuthal Resistivity Offset Wenner Soundings," *Geophysics*, v. 64, pp. 739-745.

Weiss, C. et al. (2002) "Electromagnetic Induction in a Fully 3-D Anisotropic Earth," *Geophysics*, v. 67, pp. 1104-1114.

Weiss, C. J. et al. (2003) "Electromagnetic Induction in a Generalized 3D Anisotropic Earth, Part 2: The LIN Preconditioner," *Geophysics*, v.68, pp. 922-930.

Yin, C. et al. (1999) "Geoelectrical Fields in a Layered Earth With Arbitrary Anisotropy," *Geophysics*, v. 64, pp. 426-434.

Yin, C. et al. (2001) "Electromagnetic Induction in a Layered Earth With Arbitrary Anisotropy," *Geophysics*, v. 66, pp. 1405 -14160.

EP Standard Search Report (2005) 2 pages.

PCT International Search & Written Opinion (Oct. 2006) 6 pages.

*Supplementary European Search Report*, dated Aug. 19, 2010, EP 06 75 8526.

\* cited by examiner

METHOD FOR DETERMINING EARTH VERTICAL ELECTRICAL ANISOTROPY IN MARINE ELECTROMAGNETIC SURVEYS

This application claims the benefit of U.S. Provisional Patent Application No. 60/688,841 filed on Jun. 9, 2005.

FIELD OF THE INVENTION

This invention relates generally to the field of controlled-source electromagnetic surveys in offshore environments, in which a controlled electromagnetic transmitter is towed above or positioned between electromagnetic receivers on the sea floor, for the purposes of hydrocarbon exploration, development, and/or production. Specifically, the invention is a method for determining the difference between the earth's resistivity at a given location as measured using a horizontal current flow compared to that measured with a vertical current.

BACKGROUND OF THE INVENTION

Results from offshore controlled-source electromagnetic ("CSEM") surveys, such as those collected using the methods disclosed in U.S. Pat. No. 6,603,313 to Srnka and U.S. Patent Publication No. 2003/0050759 published Mar. 13, 2003 (Srnka, et al.), have shown that the resistivity in the earth can be strongly dependent upon the direction of the electrical current flow used to make these measurements. In particular, the vertical electrical resistivity can be much (two or more times) larger than the horizontal electrical resistivity, especially in finely layered rocks such as shales, and can vary in magnitude from location to location. This phenomenon is called electrical anisotropy, or specifically electrical vertical transverse isotropy ("EVTI") by practitioners in the art. The earth's electrical resistivity may also vary azimuthally (i.e. in the compass directions), but this anisotropic effect appears to be generally much less important (i.e. of much smaller magnitude) than EVTI in sedimentary basins of interest for hydrocarbon exploration.

The presence of EVTI distorts the signals received at seafloor electromagnetic receivers used in marine CSEM surveys acquired with a horizontal electric dipole ("HED") or a horizontal magnetic dipole ("HMD") controlled source, relative to that which would be received in the absence of EVTI. This distortion affects the interpretation of marine CSEM resistivity anomalies associated with the presence of reservoired hydrocarbons. Such distortion effects appear in both the amplitude and phases of measured seafloor fields, and change with frequency. These distortions can mask the presence of hydrocarbons (false negatives) or incorrectly suggests their presence (false positives). Distortions of this kind have been observed in numerous CSEM surveys.

Marine CSEM surveys for hydrocarbon applications have been acquired using HED controlled sources because of their operational advantages and superior coupling of energy into the earth. (Chave, et al., "Electrical Exploration Methods for the Seafloor," *Electromagnetic Methods in Applied Geophysics* 2, 931-966, Soc. Expl. Geophysics, Tulsa (1991)). HED sources produce both vertical and horizontal electrical currents in the earth. HMD sources also produce both vertical and horizontal electrical currents, but to date have not been used for offshore hydrocarbon applications because of their low power and other operational constraints. The vertical electric dipole ("VED") method (Edwards, et al., *J. Geophys. Res.* 86B, 11609-11615 (1981)) produces primarily vertical currents in the earth, but with much lower efficiency (poorer coupling) than HED sources. The vertical magnetic dipole ("VMD") source produces essentially only horizontal earth currents, and to date has also not been used in marine CSEM surveys due to operational disadvantages. The measurement of both online and offline ("broadside") horizontal inline (Ex) and crossline (Ey) seafloor electric field components that measure earth responses from an HED source is known in the art of marine CSEM surveys for structural studies.

It is well known to practitioners of the art that the earth's electrical resistivity can be anisotropic. See, for example, Keller and Frischnecht, *Electrical Methods in Geophysical Prospecting*, 33-39, Pergamon (1966); Kaufmann and Keller, *Frequency and Transient Soundings*, 257-284, Elsevier, N.Y. (1983); Negi, et al., *Anisotropy in Geoelectromagnetism*, Elsevier, N.Y. (1989); Zhdanov and Keller, *The Geoelectrical Methods in Geophysical Exploration*, 119-124, Elsevier, N.Y. (1994). Several authors teach how to calculate (model) the anisotropic earth electrical responses for various controlled sources. See, for example, Chlamtac and Abramovici, *Geophysics* 46, 904-915 (1981); Yin and Weidelt, *Geophysics* 64, 426-434 (1999); Yin and Maurer, *Geophysics* 66, 1405-1416 (2001). Also, several authors discuss the interpretation of azimuthal electrical anisotropy (for example, Watson and Barker, *Geophysics* 64, 739-745 (1999); and Linde and Peterson, *Geophysics* 69, 909-916 (2004)). Others discuss the interpretation of EVTI (Jupp and Vozoff, *Geophys. Prospecting* 25, 460-470 (1977); Edwards, et al., *Geophysics* 49, 566-576 (1984); and Christensen, *Geophys. Prospecting* 48, 1-9 (2000)) using a variety of controlled sources. Tompkins et al., ("Effect of Vertical Anisotropy on Marine Active Source Electromagnetic Data and Inversions," EAGE 65th Annual Convention, Paris, France, abstract E025 (2004)) describe several effects of EVTI in marine CSEM data collected for hydrocarbon applications, using only (seafloor) electric field measurements.

Jupp and Vozoff (citation above) describe the use of onshore CSEM and magneto telluric (MT) data to estimate EVTI. They used zero-frequency (DC) controlled-source HED data measured only on the source line, and did not discuss the case of offshore applications at or near the seafloor where the electromagnetic responses are quite different from onshore. DC controlled-source resistivity data are inline static electric field values measured at various distances from the grounded HED source along the source line, and are sensitive to both vertical and horizontal resistivities as discussed in other references cited herein. Jupp and Vozoff show, using synthetic data, that the EVTI can be determined from data that are sensitive to only the horizontal resistivity combined with the DC HED data. MT data have this sensitivity only to the horizontal resistivity, which has been well known in the art. Jupp and Vozoff describe a one-dimensional inversion algorithm that uses the DC HED and MT data to successfully solve for the EVTI.

The published efforts to quantitatively determine the extent of the EVTI effect (such as Chlamtec) attempt to do so using conventional CSEM data which is sea-bottom measurements of electric field components, usually horizontal components. None of them propose particular data acquisition techniques such as the use of certain source and receiver combinations and the measurement of other electromagnetic field components such as $H_z$ in conjunction with subsequent data processing steps to assess EVTI. None of the above-mentioned publications disclose the use of vertical magnetic field ($H_z$) measurements in combination with electric field measurements, in order to determine the EVTI. However, the use of $H_z$ data for electromagnetic prospecting on land is well known, for example using the Tipper value in magneto tellurics to detect 3D structure (Kaufman and Keller, *The Magnetotelluric Method,* 483-484, Elsevier (1981)), or using $H_z$ data collected at the center of a vertical magnetic dipole (VMD) source in the central loop induction method for resistivity depth sounding (Zhdanov and Keller, *The Geoeletrical Methods in Geophysical Exploration,* 396-411, Elsevier (1994)).

Instead, the published literature tends to suggest that the useful onshore response of $H_z$ may be replaced by $E_z$ responses offshore in the presence of deep seawater (Berdichevsky, et al., *Marine Deep Geoelectrics* (in Russian), Nauka, Moscow (1989); Golubev and Zhdanov, Consortium for Electromagnetic Modeling and Inversion Annual Report, 175-217, U. Utah (1998)). Although Cheesman et al. (*Geophysics* 52, 204-217 (1987)) show calculated offline $H_z$ values for an HED seafloor source, they do not disclose its use in combination with online seafloor $E_x$, $E_y$, or $E_z$ signals, nor do they discuss use of $H_z$ for determination of EVTI.

SUMMARY OF THE INVENTION

In one embodiment, the invention is a computer-implemented method for determining earth vertical electrical anisotropy from an electromagnetic survey of a subsurface region located below the water bottom in an offshore environment, said survey using an electromagnetic source and a plurality of electromagnetic receivers, said method comprising: (a) obtaining electromagnetic field data at a plurality of online and offline receiver locations from the survey's results, said data comprising a field component sensitive only to vertical resistivity and a field component sensitive only to horizontal resistivity, wherein "online" and "offline" are defined with respect to a survey line ("source line") of electromagnetic source positions (step 71 of FIG. 7); (b) solving Maxwell's electromagnetic field equations for horizontal resistivity and vertical resistivity at an (x,y,z) position in the subsurface region, using survey acquisition parameters and the measured electromagnetic field data (step 72); and (c) obtaining a measure of vertical electrical anisotropy at location (x,y,z) from the calculated horizontal and vertical resistivities (step 73).

BRIEF DESCRIPTION OF THE DRAWINGS

The present invention and its advantages will be better understood by referring to the following detailed description and the attached drawings in which.

Figure 1:
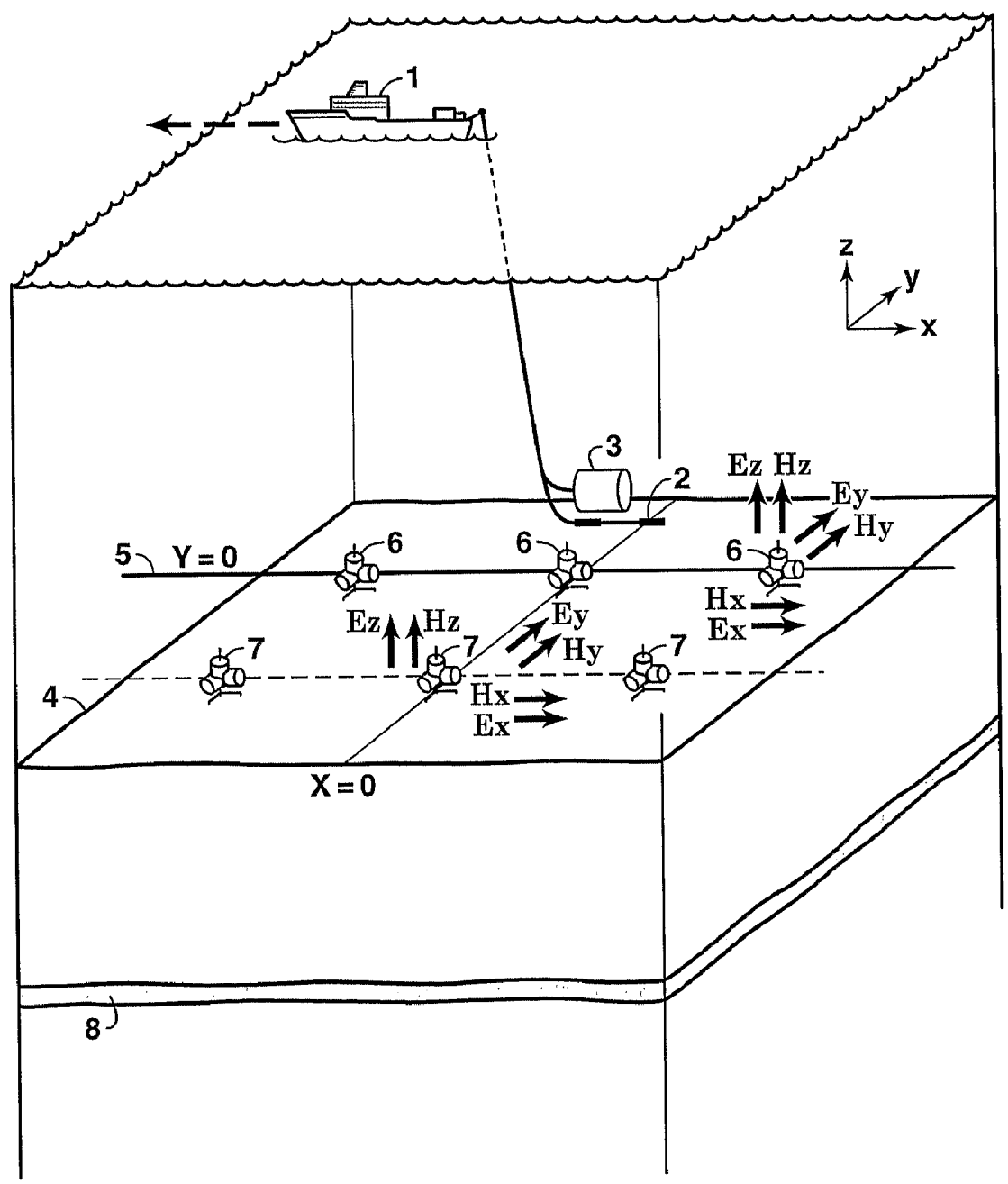
FIG. 1 illustrates a survey geometry for one embodiment of the present invention.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE INVENTION

The invention is a method for determining the electrical vertical transverse anisotropy effect on controlled-source marine electromagnetic survey data. The invention requires measured data for at least one online electromagnetic field component and at least one offline component, the selection of particular components depending upon the source type. The invention depends upon the realization that certain electromagnetic field components are sensitive predominantly or almost exclusively only to either vertical resistivity or horizontal resistivity, but not both, whereas other field components are sensitive to both. To utilize these facts, the CSEM source needs to produce both vertical and horizontal currents. Two types of marine CSEM source do this, the HED and the HMD. The invention prescribes particular electromagnetic field measurement data required for each of the two source types.

HED Source For an HED source, data are preferably obtained representing simultaneous measurements of: a) the vertical magnetic field ($H_z$), and either (or both) the horizontal inline (x) component of the electric field ($E_x$), or crossline (y) component of the magnetic field ($H_y$), all responses measured at positions offline to the electromagnetic source line; together with the following responses measured at online locations: b) the currently practiced vertical electric ($E_z$) field response, and either (or both) the horizontal inline electric field ($E_x$) and the crossline magnetic field ($H_y$) responses.

HMD Source For an HMD source, data are preferably obtained representing simultaneous measurement of: a) the online vertical magnetic field ($H_z$), and either (or both) the online horizontal inline magnetic field ($H_x$) and the online horizontal crossline electric field ($E_y$) responses; together with: b) the offline vertical electric field ($E_z$) response, and either (or both) the offline horizontal inline magnetic field ($H_x$) and the offline horizontal crossline electric field ($E_y$) response.

A combination of these two embodiments exists wherein both an HED and an HMD source are used, either simultaneously or sequentially, and the seafloor electric and magnetic field responses appropriate for each source type are measured as described above.

In those embodiments of the invention that use an HMD controlled source, part of the rationale for the data acquisition requirements set forth above is that $H_z$ online is sensitive only to the horizontal resistivity and $E_z$ offline is sensitive only to the vertical resistivity; whereas $H_x$ and $E_y$ online and offline are both affected by EVTI (i.e. by both horizontal and vertical resistivities). The HMD responses may be used alone in the iterative modeling and inversion methods described below, or they may be used in conjunction with the HED responses.

Similarly, in those embodiments using an HED source, part of the rationale is that the online $E_z$ data are sensitive only to the vertical electrical resistivity and the offline $H_z$ data are sensitive only to the horizontal resistivity and become maximum at x=0; whereas all online and offline $E_x$ and $H_y$ data contain responses from both vertical and horizontal resistivity. The HED responses may also be used alone or in conjunction with HMD responses.

Either frequency-domain or time-domain techniques may be used for data acquisition, processing, analysis, and interpretation. The choice between time-domain and frequency-domain techniques is largely determined by operational considerations (such as water depth) that are well understood by practitioners of the art.

The sources, seafloor instruments, and electric and magnetic field sensors required for this invention are also well known to practitioners of offshore CSEM or magneto telluric surveys.

FIG. 1 illustrates a possible data acquisition (survey) geometry for the present invention. A vessel 1 at or below the surface of the sea tows an HED source 2 and/or an HMD source 3 near the seafloor 4 along the source line 5, and transmits a specified waveform of electrical current. Alternatively, the HED and/or HMD source may be positioned in a stationary manner near or in contact with the seafloor between each pair of the individual online seafloor electromagnetic receivers 6 along line 5, while the source waveform transmission occurs. The choice of using a continuously towed and/or a stationary source depends on a variety of operational survey conditions, but primarily on the electromagnetic noise environment. Both source-generated and natural noises increase as the depth of water decreases, favoring the use of stationary sources in shallow water (typically 150 meters or less) so that very long data summation (stacking) times can be used, without lateral smearing of data, to suppress random noises. The source waveform transmission may consist of a variety of waveforms of suitable durations, such as those described in PCT Patent Publication WO2005/117326 by Lu, et al., or more generally in the two previously referenced Srnka patent publications. The offline receivers 7 record the earth's electromagnetic response due to the source excitation, simultaneously with the response being measured by the online receivers 6. The source line, online receivers, and offline receivers are placed on the seafloor above and in the vicinity of subsurface geologic formations 8 within the earth that have been identified as potential reservoirs for hydrocarbons or other resources. The seafloor receivers are positioned at various distances from the HED or HMD source, using either uniform or nonuniform inter-receiver spacing (or both), as determined from pre-survey modeling of the anticipated seafloor responses or by operational constraints as will be well understood by practitioners of the art. Typically, the inline and crossline spacings of the receivers are from 500 to 5000 meters.

With electromagnetic data acquired as described above, the present invention allows the EVTI value to be determined in the region encompassed by each online and offline receiver combination of the survey, using one or more data analysis and interpretation methods. The amount, depth, and lateral distributions of any EVTI present is determined from analyses of selected components of the online and offline field responses at the available survey frequencies; the highest frequency determining the EVTI at the shallowest depth (beginning at the seafloor and extending downward approximately one EM skin depth), and the lowest frequency providing the integrated EVTI effects from the shallowest depths to the greatest depth of effective penetration (approximately one-half of the diffusive EM wavelength, or $\pi$ (pi) times the electromagnetic skin depth). This determination allows EVTI effects to be removed from, or to be accounted for in, the seafloor CSEM data so that accurate prediction of reservoir resistivity (i.e. resistivity of a buried target reservoir formation) can be performed.

The individual data processing steps applied in the present inventive method to selected components of the inline online and offline electric and magnetic field data are standard procedures used by practitioners of offshore CSEM surveys.

The data analysis and interpretation methods of this invention include, but are not restricted to, four complementary approaches:

(1) Iterative 1D, 2D, and/or 3D forward modeling on a digital computer using algorithms for isotropic earth calculations, well known to practitioners of the art including those referenced herein, in which the actual data (amplitudes and/or phases) are compared with the model responses (amplitudes and/or phases), and the model is subsequently adjusted so as to match the actual field data with the modeled responses. In this isotropic interpretation method, if HED data are to be used, the online responses are modeled using the vertical electrical resistivity, and the offline responses are modeled using the horizontal resistivity, and the reverse if HMD data are to be used. (See Table 1 below.) Iterative adjustments to the vertical resistivity model are made by comparing to measured data for an EM field component that is sensitive preferably only, but at least predominantly, to vertical resistivity, and correspondingly for the horizontal resistivity model. Where offline data are used, the data are preferably from receivers exactly broadside to the source (i.e., at x=0 in FIG. 1). The ratio of the online to the offline model results (resistivity versus depth z and location x,y) then provides an approximate value of EVTI as a function of depth and position.

(2) Iterative 1D, 2D, and/or 3D forward modeling on a digital computer using algorithms for anisotropic earth calculations that include EVTI, well known to practitioners of the art including the previously referenced paper by Yin and Maurer, in which the actual data (amplitudes and/or phases) are compared with the model responses (amplitudes and/or phases), and the model is subsequently adjusted so as to match the actual field data with the modeled responses. In this anisotropic interpretation method, the online and offline responses are simultaneously modeled using estimates of both vertical and horizontal resistivity. The final model solution then contains the EVTI value (amount) as a function of both depth and lateral position.

(3) Automated 1D, 2D, and/or 3D mathematical inversion (imaging) on a digital computer using isotropic resistivity algorithms well known to practitioners of the art (see, for example, Newman et al., *Three Dimensional Electromagnetics* (Oristaglio and Spies, eds.) Soc. Expl. Geophysicists, Tulsa, 299-321 (1999)). In one embodiment of this isotropic inversion method, $E_x$ online and $E_z$ online for an HED source (or $H_x$ online and $H_y$ offline for an HMD source), and the offline $H_z$ for an HED source (or $H_z$ online for an HMD source), are input separately into the inversion program which then uses numerical optimization algorithms to separately solve for the amount, depth, and lateral distribution of horizontal and vertical resistivities whose electromagnetic responses best fit the observed seafloor data. The EVTI is then found by subsequently forming the ratio of the inverted vertical to horizontal resistivity at each depth and location. As with isotropic forward modeling, a key is that one inversion solution uses electromagnetic field data that are more sensitive to vertical resistivity, while the other inversion solution uses data that are more sensitive to horizontal resistivity.

(4) Automated mathematical inversion (imaging) programs on a digital computer using anisotropic 1D resistivity algorithms (see, for example, the previously referenced paper by Tompkins, et al.), and anisotropic extensions of 2D and 3D frequency-domain and time-domain finite difference algorithms previously developed by practitioners of the art (see, for example, Weiss, et al., *Geophysics* 67, 1104-1114 (2002); and Weiss, et al., *Geophysics* 68, 922-930 (2003)). In this anisotropic inversion method, the online and offline responses are input jointly into the inversion program which then uses numerical optimization algorithms to solve for the amount, depth, and lateral distribution of horizontal and vertical resistivities whose electromagnetic responses best fit the observed seafloor data.

The isotropic approaches require two separate computer runs of either the iterative forward modeling program or the inversion program. One run involves data for at least one electromagnetic field component sensitive preferably only, but at least predominantly, to horizontal resistivity, and the output is an horizontal resistivity data volume. The other run involves data for at least one EM field component sensitive preferably only, but at least predominantly, to vertical resistivity, and the output is a vertical resistivity data volume. The anisotropic approaches input all data into a single run. The data can be for field components that are sensitive to both vertical and horizontal resistivity; however, the method works better if the data include a component sensitive only to vertical resistivity and another sensitive only to horizontal resistivity. Thus, a preferred electromagnetic data set for one approach will be a preferred set for all approaches (for a given source type). Table 1 lists sensitivity to vertical resistivity $\rho_V$ and to horizontal resistivity $\rho_H$, or both, for both HED and HMD source types, and for online and offline receiver location. (Preferred offline data are from locations broadside to the source.) The entries in Table 1 of most interest for the present invention are those for which the data depend at least predominantly on either $\rho_V$ or $\rho_H$. It can be seen from Table 1 and the preceding description of the method that all of the preferred embodiments of the invention require online measurement of at least one EM field component and offline measurement of at least one EM field component. Additional data provide the expected data redundancy benefits. In Table 1, sensitivity labeled "only" to $\rho_V$ or $\rho_H$ assumes a flat-layered earth model, and it must be recognized that in actual situations such sensitivity will not be quite so pure. It must also be recognized that Table 1 applies to offshore environments. Table 1 would be changed considerably for on-land applications.

TABLE 1

Marine CSEM Data - EVTI Responses

| Source | Receiver Location | Data | $\rho_v/\rho_h$ Resistivity Sensitivity |
|---|---|---|---|
| HED | Online | $E_x$ | both (predominantly $\rho_v$) |
| " | " | $H_y$ | both (predominantly $\rho_v$) |
| " | " | $E_z$ | only $\rho_v$ |
| " | " | $E_y, H_x, H_z$ | are theoretically = 0 |
| HED | Offline | $E_x$ | both (predominantly $\rho_h$) |
| " | " | $H_y$ | both (predominantly $\rho_h$) |
| " | " | $H_z$ | only $\rho_h$ |
| " | " | $E_y, E_z, H_x$ | both (mixed $\rho_v$ and $\rho_h$) |
| HMD | Online | $E_y$ | both (predominantly $\rho_h$) |
| " | " | $H_x$ | both (predominantly $\rho_h$) |
| " | " | $H_z$ | only $\rho_h$ |
| " | " | $E_x, E_z, H_y$ | are theoretically = 0 |
| HMD | Offline | $E_y$ | both (predominantly $\rho_v$) |
| " | " | $H_x$ | both (predominantly $\rho_v$) |
| " | " | $E_z$ | only $\rho_v$ |
| " | " | $E_x, H_y, H_z$ | both (mixed $\rho_v$ and $\rho_h$) |

The skilled practitioner will readily recognize that all of the above approaches, whether isotropic or anisotropic, forward modeling or inversion, involve solving Maxwell's electromagnetic field equations by computer-assisted numerical methods. With the source acquisition parameters all known, along with the background resistivities (salt water, etc.), and measured data for at least two EM field components, the only unknown is target resistivity and it can be solved for.

The iterative forward modeling approaches will typically be computer implemented, but typically require manual guidance. The data interpreter typically inputs known or estimated resistivity parameters into a starting depth model. Such a model might include among other parameters the seawater depth, water resistivity and its vertical gradient, the resistivity of the air, and a first guess at the resistivity of the earth based on prior knowledge (e.g., well logs from a similar area), associated data (e.g. seismic velocities converted to resistivity through a statistical relationship), and general experience in the technology. Often a uniform background resistivity value is chosen. The primary effect of the initial resistivity model is to speed or delay convergence. The model is then run on a computer using an algorithm that solves Maxwell's equations for the chosen input values, and as a result synthetic data are obtained for the survey configuration corresponding to the real data. The interpreter then compares the synthetic and real data at several locations, and based on available knowledge of the expected response, and modifies the resistivity in the model so as to bring the synthetic data closer to the real data. The process is typically repeated a number of times until criteria set by the interpreter are met, i.e. the final resistivity-depth model's synthetic data match the real data within some accepted limit. If the process is not converging, this typically means that the geology is complex requiring that more frequencies, source-to-receiver distances, and E or H components need to be examined, or that the measured data are somehow corrupted.

In the inversion approaches, the data interpreter builds a starting resistivity depth model, using known values (seawater, air, etc.) and a starting guess for the earth resistivity often taken as uniform and representative of the area as determined by experience, nearby values, as described above for forward modeling approaches. The real data are then input into a computer algorithm along with the starting resistivity model, and the algorithm generates synthetic data by solving Maxwell's equations, which is typically done by numerical, iterative schemes well known in the art. In preferred embodiments of the invention, the algorithm uses mathematical techniques, such as derived gradients in the differences between real and synthetic data, to find changes in the model that will result in minimizing the misfit between the real and synthetic data in the next iteration of the process. The computer algorithm is capable of handling much more complexity in the data and model than a human interpreter, and is allowed to continue to operate its internal iterative processes until the misfit between real and synthetic data reaches some preset small value. At this point the mathematical answer is said to have converged to an optimal solution, which corresponds to a final resistivity-depth model that best represents the real earth resistivity structure including any hydrocarbons that are present.

A user of the present invention might, for example, select an embodiment in which both iterative modeling and inversion in the frequency domain as described herein are used, but limited to anisotropic computer programs and algorithms, to provide cross-checking of EVTI results and also to better incorporate the interpreter's geologic knowledge. The data selected might, for example, have been acquired using an HED controlled source that is either towed near the seafloor (preferably between 25 and 50 meters) or is placed in stationary positions on the seafloor between consecutive pairs of seafloor receivers along the source line. In such a case, only online $E_x$ and $E_z$ electric field responses are needed, measured simultaneously with only the offline $H_z$ responses, at a variety of online and offline ranges, typically zero (0) to 12,000 meters online and one (1) to 8,000 meters offline for an HED strength (dipole moment) of 300,000 Ampere-meters. Practitioners of the art will understand that the choice of online and crossline (offline) ranges, i.e., source-to-receiver distances, for these response measurements depend on the source strength and frequencies used in the survey, which in turn depend on the expected horizontal and vertical resistivities of the earth and the depth to the target(s) of interest.

An alternative to the Table 1 options for a field component measurement sensitive only to horizontal resistivity exists in the form of passive source electromagnetic measurements. Measuring electromagnetic response in the absence of a man-operated source is a known technique called magneto telluric ("MT") surveying. The published literature discloses how to measure the earth's resistivity below the seafloor using the passive-source marine magnetotellurics ("MMT") method (Constable et al., *Geophysics* 63, 816-825 (1998); Hoversten et al., *Geophysics* 65, 1476-1488 (2000)). The energy source for magnetotellurics is the natural fluctuations in the Earth's ambient magnetic field, due primarily to ionospheric functions and lightning. MMT measurements are typically confined to horizontal electric and magnetic fields ($E_X$, $E_Y$, $H_X$, $H_Y$), although vertical electric field ($E_Z$) data is sometimes useful for estimating lateral variations in geological structures (Zhdanov and Wan, "Three-dimensional marine magnetotellurics for petroleum exploration", *SEG 2003 Annual Meeting Expanded Abstracts*, 537-540 (2003)). Analyses of these data yield information almost entirely limited to the horizontal resistivity.

EXAMPLES

Figure 2:
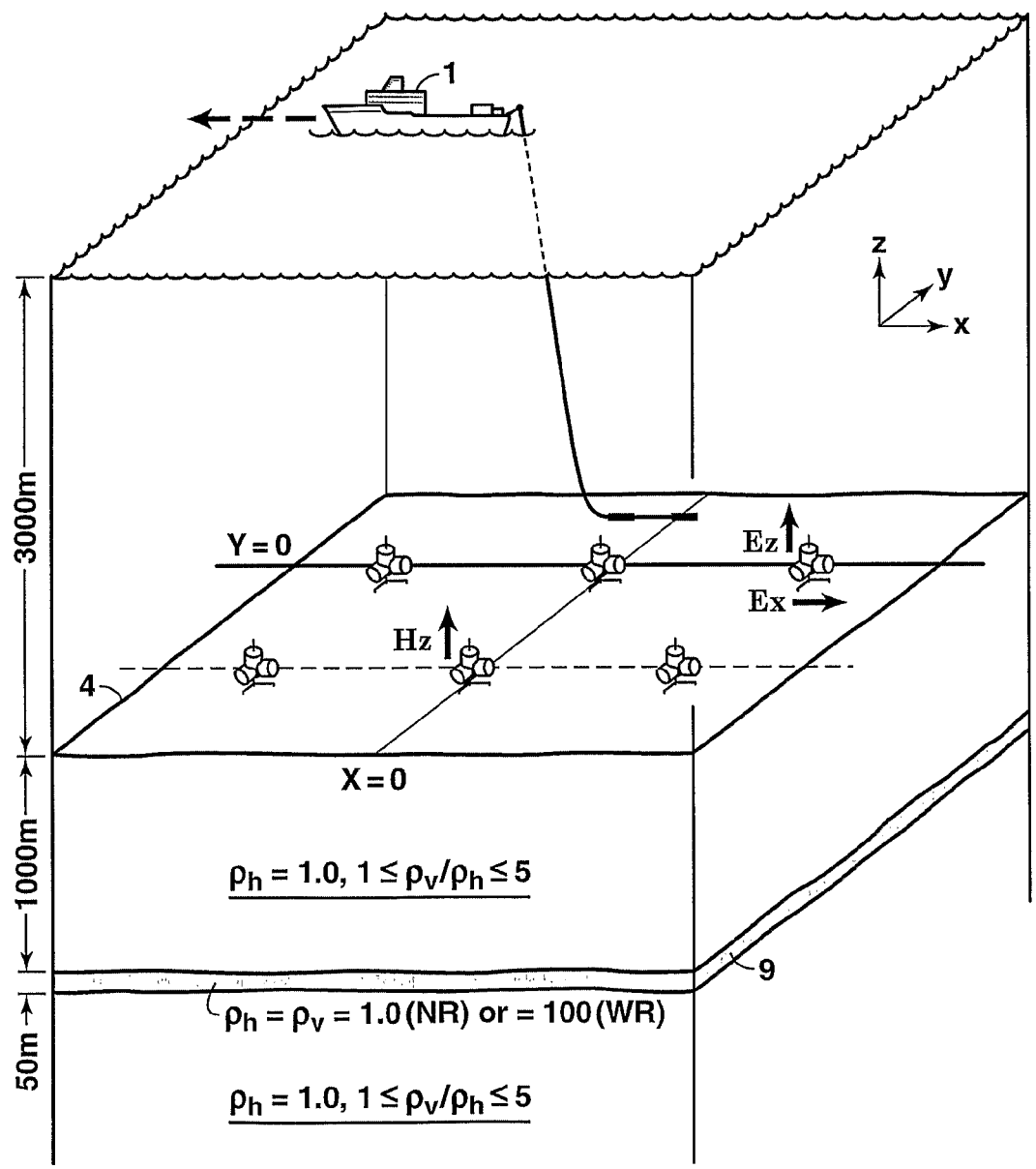
FIG. 2 illustrates the survey geometry and resistivity model used to generate example EVTI responses.
Figure 3A:
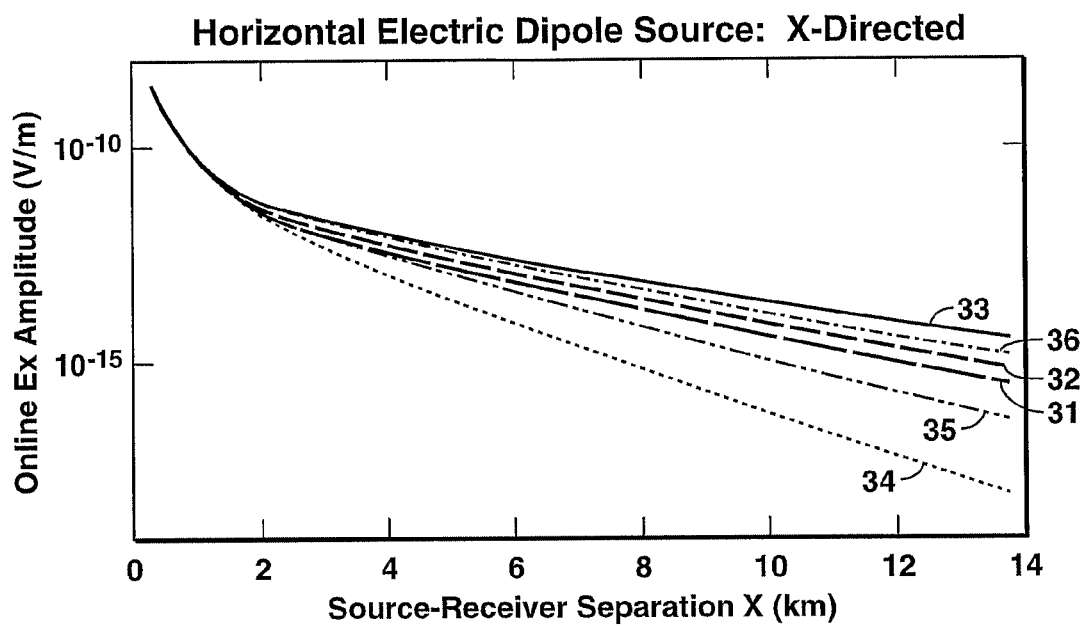
FIG. 3A shows online $E_x$ amplitude and FIG. 3B shows $E_x$ phase for an HED source and for varying values of EVTI, with and without a resistive layer in the model of FIG. 2.
Figure 3B:
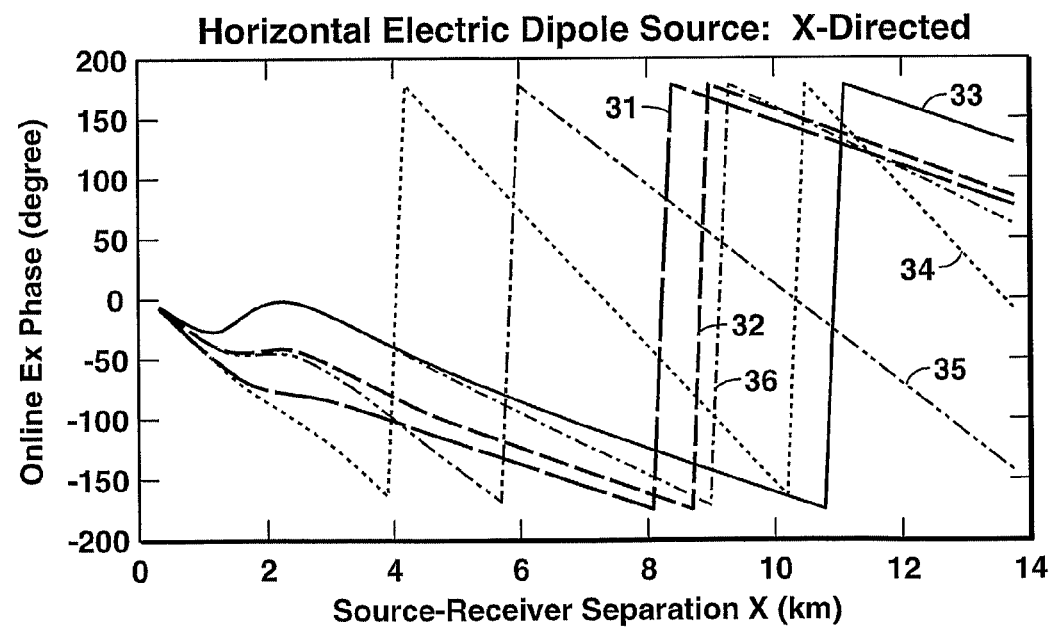

In lieu of actual CSEM data of the type and combination required in this invention, numerical calculations that employ 1D methods well known to practitioners of the art are used herein to demonstrate the EVTI responses utilized by the invention. FIG. 2 shows the survey geometry used for this model calculation of CSEM response data. The example uses a seawater depth of 3000 meters and a 50 meter thick, simulated hydrocarbon reservoir 9 buried 1000 meters below the seafloor 4. FIGS. 3A and 3B show the calculated changes in the HED source-normalized (i.e., responses for a unit dipole of length one meter and current of one Ampere) online $E_x$ seafloor field amplitudes in volts/m (FIG. 3A) and the absolute phases (FIG. 3B) caused by EVTI of varying magnitudes (1:1 to 5:1 EVTI ratio ρv:ρh, where ρv is the vertical resistivity and ρh is the horizontal resistivity), corresponding to the survey geometry and earth parameters of FIG. 2 for a sinusoidal source frequency of 0.25 Hertz. The anisotropy is typically found in the earth above and below the hydrocarbon layer, and can be present within the hydrocarbon layer if, for example, the reservoir is highly stratified. But unless the hydrocarbon layer is thick enough to be resolved by the electromagnetic data, its EVTI effect is not large enough to be important in the model data, and so the reservoir may be assumed to have isotropic resistivity for these simulations. The HED is aligned in the x-direction (sometimes referred to as an XED source). (It is typical in MCSEM practice to align an HED source, which is basically a long wire, with the direction in which it is being towed, this being the orientation it will naturally tend to assume when towed by a cable connected to one end.) The horizontal resistivity ρh is set at 1.0 ohm-m for this calculation (except for some cases shown in FIG. 6—see below). The horizontal axis is the distance x along the source line, measured in terms of the distance of the moving source from a particular online receiver, i.e., one of the receivers 6 located along the source towline 5 (see FIG. 1).

Practitioners of the art will understand that other values of the input parameters could be used equally well in this illustration. The reservoir layer 9 is assumed to have resistivity of 100 ohm-m (electrically isotropic, EVTI=1). Six curves display seafloor receiver responses for various cases of either the reservoir 9 present or not present, and for varying values of overburden and underburden EVTI. In all of the FIGS. 3A-B through 4A-B, the second digit in the reference number denotes the EVTI value and whether the reservoir layer is present ("WR") in the model or not present ("NR") according to the following key: 1 denotes EVTI=ρV/ρH=1, WR; 2 denotes EVTI=2, WR; 3 denotes EVTI=5, WR; 4 denotes EVTI=1, NR; 5 denotes EVTI=2, NR; and 6 denotes EVTI=5, NR. (With βh fixed at unity, the EVTI is numerically the same as ρv in ohm-m). It can be seen that as the EVTI effect increases, the presence or absence of the target layer makes progressively less difference, which illustrates need for the present invention.

Figure 4A:
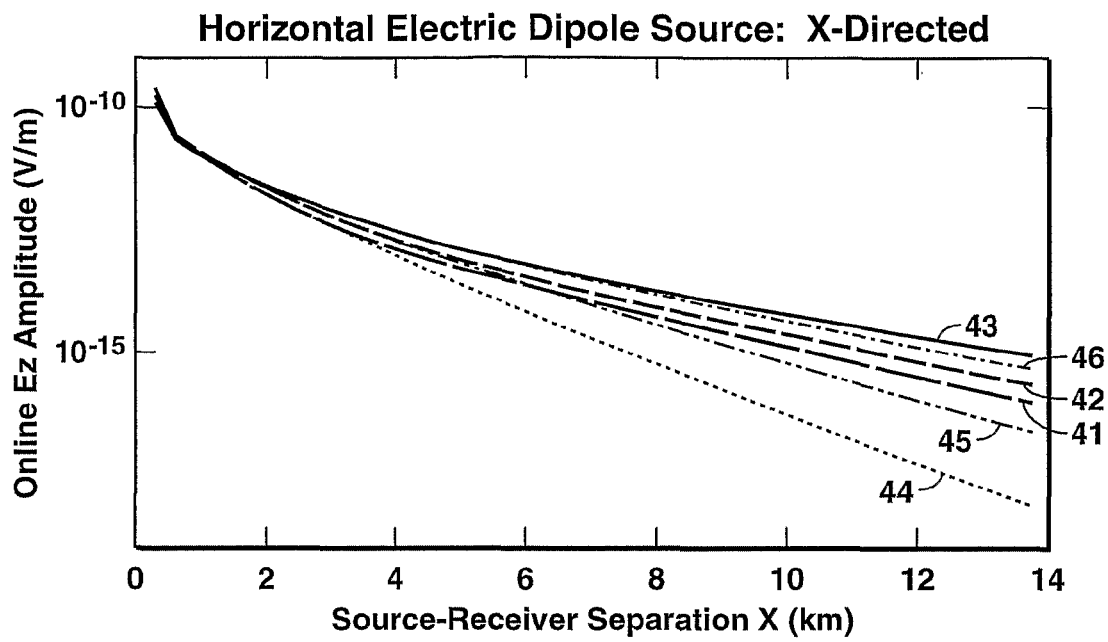
FIG. 4A shows online $E_z$ amplitude and FIG. 4B shows $E_z$ phase for an HED source and for varying values of EVTI, with and without a resistive layer in the model.
Figure 4B:
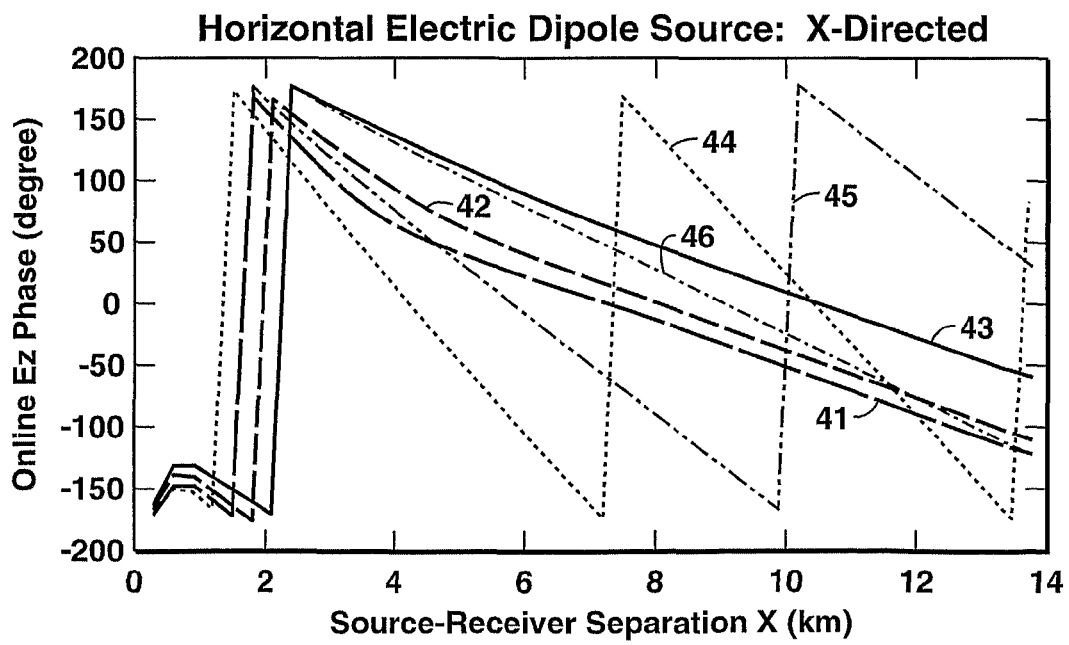

FIGS. 4A and 4B show the same calculations for the online Ez response. These figures (3A-B and 4A-B) show that the WR responses for no anisotropy (EVTI=1, or ρv:ρh=1:1), for a hydrocarbon-filled reservoir, i.e., curves 31 and 41, are bracketed by the NR responses for the absence of a reservoir by the EVTI=2 and EVTI=5 cases, i.e., bracketed by curves 35-36 and 45-46, respectively. The practitioner of the art will readily see from FIGS. 3A-B and 4A-B that analysis and interpretation of online $E_X$ and/or $E_Z$ responses alone, as indicative of a buried hydrocarbon reservoir response, could easily be false positive indications resulting from an EVTI value of about 3 to 4 and no reservoir present.

In contrast to the responses shown on FIGS. 3A-B and 4A-B, FIGS. 5A and 5B show the offline $H_Z$ seafloor amplitude (in Amperes/meter) and phase responses for these same EVTI ranges and survey geometry given in FIG. 2, at a position directly broadside (x=0) from the HED source. The horizontal axis is now the distance y perpendicular to the source line. Although FIG. 2 shows only one row of offline receivers, the model calculations were performed for receivers at several y-values. All of the response curves overlie each other in FIGS. 5A-B, except for curve 56 (EVTI=5, NR) in FIG. 5B, which deviation reflects a small phase effect for the largest EVTI (5:1) that is due to the presence of the electrically isotropic reservoir layer containing no modeled hydrocarbons ("NR"). This small phase effect vanishes when the layer is absent (i.e. also has EVTI of 5:1).

Figure 5A:
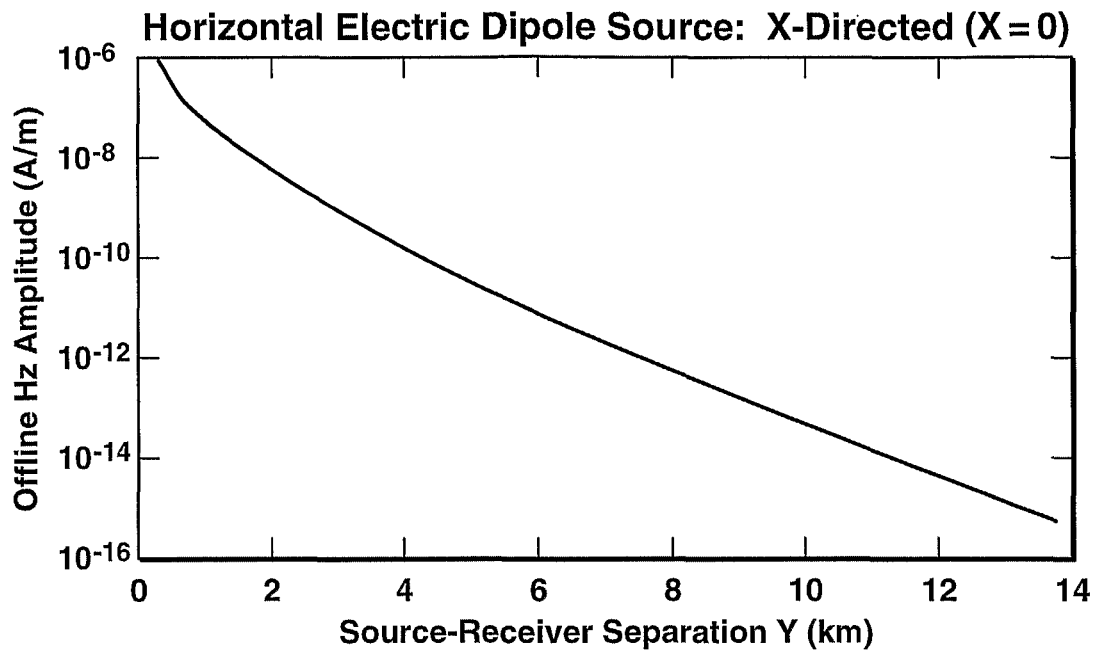
FIG. 5A shows offline $H_z$ amplitude and FIG. 5B shows $H_z$ phase for an HED source and for varying values of EVTI, with and without a resistive layer in the model.
Figure 5B:
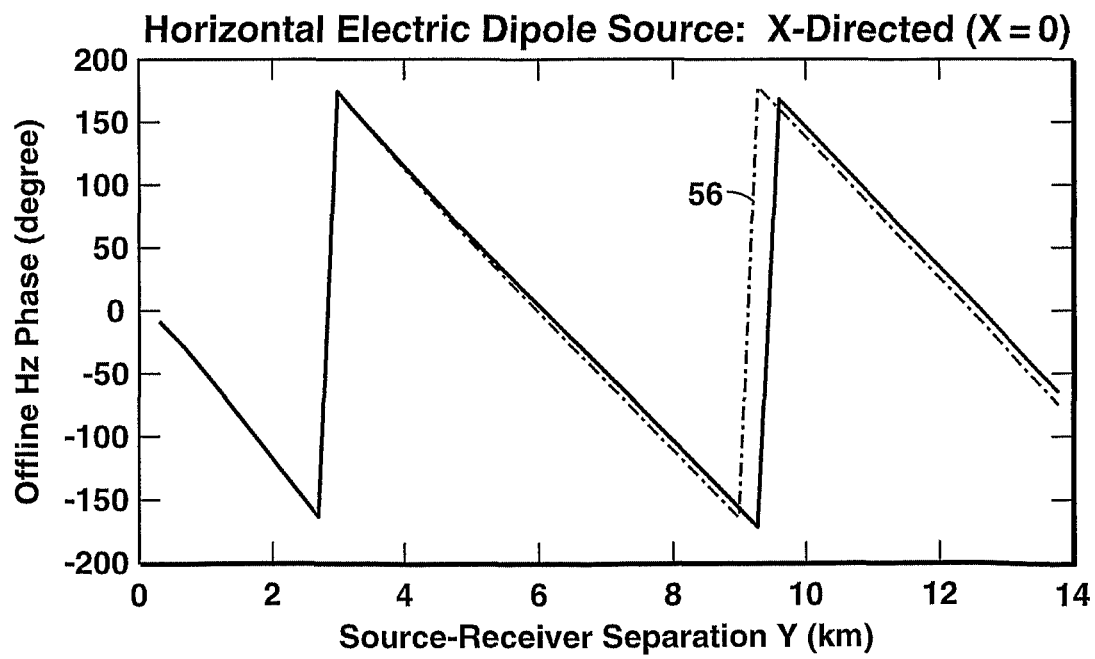
Figure 6:
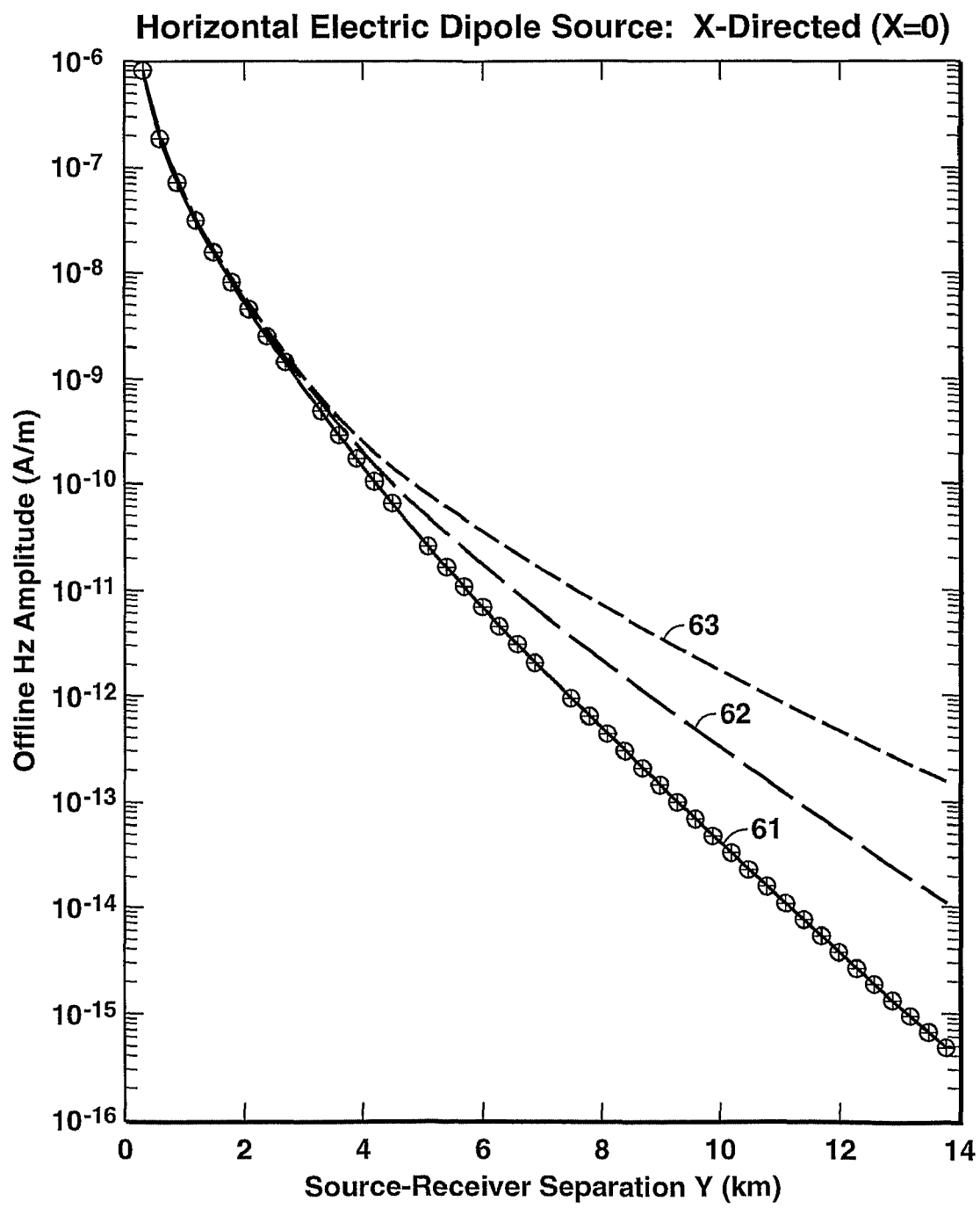
FIG. 6 shows that offline $H_z$ (for an HED source) is sensitive to changing values of $\rho_h$ but not to EVTI.
Figure 7:
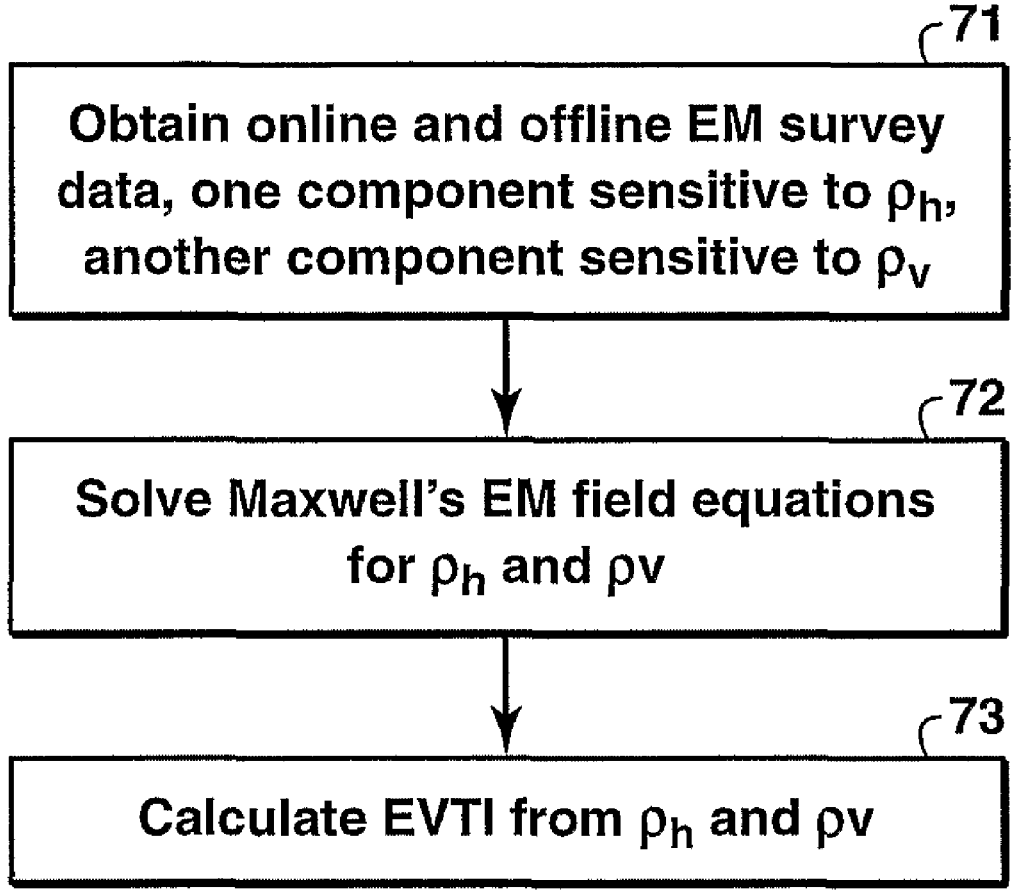
FIG. 7 is a flow chart showing basic steps in the present inventive method.

FIGS. 5A-B demonstrate that $H_Z$ offline is insensitive to EVTI, consistent with the entry in Table 1 to the effect that offline $H_Z$ depends only on $ρ_h$ for a HED source. FIG. 6 shows the $H_Z$ calculation at x=0 for the survey configuration of FIG. 2, but now for three cases 61, 62 and 63 where the horizontal resistivity $ρ_h$ has values of 1.0, 2.0, and 5.0 ohm-m, respectively, and the buried layer has been removed. Curve 61 is actually three curves that lie virtually superimposed. The three cases represented by 61 are $ρ_V$=1, 2 and 5 ohm-m with $ρ_h$ held constant at 1 ohm-m. Curve 62 is the model result for ρh=$ρ_V$=2 ohm-m, and curve 63 for $ρ_h$=$ρ_V$=5 ohm-m.

It is clear from FIG. 6 that $H_Z$ offline is sensitive to changing values of $ρ_h$ but not to EVTI. Thus, measurement of $H_Z$ offline can be used to separately determine $ρ_h$ using iterative modeling or inversion as described herein. It may be noted that only $ρ_h$ results, obtained from offline $H_Z$ data, could be used to identify resistive anomalies. Such data are affected by EVTI. However, $ρ_h$ information alone, or $ρ_V$ information alone, is inadequate for uniquely identifying anomalies of interest. It may further be noted that online $E_Z$ measurements would generate (not shown) a result similar to FIGS. 5A-B for varying EVTI. This is not seen in FIGS. 4A-B because the calculations for these examples obtained the different values of EVTI by holding $\rho_h$ constant and varying $\rho_V$. If instead $\rho_V$ had been held constant and $\rho_h$ varied, then FIGS. 4A-B would have shown all six parametric curves virtually superimposed just as in FIGS. 5A-B. (Online $E_Z$ is sensitive only to $\rho_V$ (for HED source); see Table 1.)

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

We claim:

1. A computer-implemented method for determining earth vertical electrical anisotropy from an electromagnetic survey of a subsurface region located below the water bottom in an offshore environment, said survey using an electromagnetic source and a plurality of electromagnetic receivers, said method comprising:
   (a) obtaining electromagnetic field data from the survey's results at a plurality of online and offline receiver locations and corresponding to selected ones, but fewer than all, of the six electromagnetic field components $E_X$, $E_Y$, $E_Z$, $H_X$, $H_Y$, and $H_Z$, said selected components comprising a field component selected because it is sensitive at least predominantly to vertical resistivity and a field component selected because it is sensitive at least predominantly to horizontal resistivity, wherein the terms online and offline are defined with respect to a survey line, called a source line, of electromagnetic source positions, and wherein determination of predominantly sensitive depends upon source type and upon receiver location relative to the source line;
   (b) solving Maxwell's electromagnetic field equations for horizontal resistivity and vertical resistivity at an (x,y,z) position in the subsurface region, using survey acquisition parameters and the selected components of measured electromagnetic field data, said solving being performed on a computer by either inversion or forward modeling techniques; and
   (c) obtaining a measure of vertical electrical anisotropy at location (x,y,z) from the calculated horizontal and vertical resistivities.

2. The method of claim 1, wherein the (x,y,z) position is representative of a sub-region of said subsurface region, said sub-region containing a pair of receiver locations, one online and one offline.

3. The method of claim 2, wherein the vertical electrical anisotropy determination is repeated for sub-regions corresponding to each online and offline pair of receivers.

4. The method of claim 2, wherein the offline receiver is located broadside to the online receiver, i.e. has the same x-coordinate, where the source line defines the x-direction.

5. The method of claim 4, wherein the electromagnetic field data for both receiver locations comprise data measured simultaneously and with the electromagnetic source located at the same x-position as the two receivers.

6. The method of claim 1, wherein depth z for the vertical electrical anisotropy determination is limited by skin depth for frequencies in the survey's source spectrum.

7. The method of claim 1, wherein said measure of vertical electrical anisotropy is the vertical resistivity divided by the horizontal resistivity.

8. The method of claim 1, wherein said electromagnetic source is a horizontal electric dipole.

9. The method of claim 8, wherein the field component sensitive at least predominantly to vertical resistivity is online $E_Z$, the vertical component of electric field, and the field component sensitive at least predominantly to horizontal resistivity is offline $H_Z$, the vertical component of magnetic field.

10. The method of claim 1, wherein said electromagnetic source is a horizontal magnetic dipole.

11. The method of claim 10, wherein the field component sensitive at least predominantly to vertical resistivity is offline $E_Z$, the vertical component of electric field, and the field component sensitive at least predominantly to horizontal resistivity is online $H_Z$, the vertical component of magnetic field.

12. The method of claim 1, wherein the electromagnetic data comprise $H_Z$ data, where $H_Z$ is the vertical component of magnetic field.

13. The method of claim 1, wherein the electromagnetic field equations are solved for electromagnetic field component values using an assumed resistivity model of the subsurface region and space above it, comparing the calculated values of field components to measured values of the field components, adjusting the model's resistivity values to compensate for any differences, and repeating the process until agreement is obtained within a predetermined criterion.

14. The method of claim 13, wherein the model is isotropic (resistivity independent of current flow direction), and the model is run twice each iteration, once assuming only horizontal resistivity, i.e. vertical resistivity=0, and once assuming only vertical resistivity, i.e. horizontal resistivity=0.

15. The method of claim 14, wherein the electromagnetic source is a horizontal electric dipole, and the model assuming only vertical resistivity is run using online $E_Z$ data and the model assuming only horizontal resistivity is run using offline $H_Z$ data, where $E_Z$ is the vertical component of electric field and $H_Z$ is the vertical component of magnetic field.

16. The method of claim 14, wherein the electromagnetic source is a horizontal magnetic dipole, and the model assuming only vertical resistivity is run using offline $E_Z$ data and the model assuming only horizontal resistivity is run using online $H_Z$ data, where $E_Z$ is the vertical component of electric field and $H_Z$ is the vertical component of magnetic field.

17. The method of claim 13, wherein the model is anisotropic, i.e. resistivity depends on current flow direction, and the model is run once each iteration.

18. The method of claim 1, wherein the electromagnetic field equations are solved using the measured field component responses as known quantities and inverting the electromagnetic field equations by an iterative numerical method to converge on a resistivity model of the subsurface region.

19. The method of claim 18, wherein the resistivity model is assumed to be isotropic.

20. The method of claim 18, wherein the resistivity model is assumed to be anisotropic.

21. The method of claim 18, wherein the electromagnetic source is a horizontal electric dipole and the electromagnetic field data comprise online $E_Z$ and offline $H_Z$ data, where $E_Z$ is the vertical component of electric field and $H_Z$ is the vertical component of magnetic field.

22. The method of claim 18, wherein the electromagnetic source is a horizontal magnetic dipole and the electromagnetic data comprise online $H_Z$ data and offline $E_Z$ data, where $E_Z$ is the vertical component of electric field and $H_Z$ is the vertical component of magnetic field.

23. The method of claim 1, wherein magnetotelluric data, i.e. data acquired with the electromagnetic source turned off or out of receiver reception range, are obtained for the field component sensitive to horizontal resistivity.

24. The method of claim 1, wherein the electromagnetic source is either a horizontal electric dipole ("HED") or a horizontal magnetic dipole ("HMD") and the field component sensitive at least predominantly to vertical resistivity and the field component sensitive at least predominantly to horizontal resistivity are selected from the following table, where the first column indicates source type, the second column receiver location, the third column electromagnetic field component(s) with the source line defining the x-direction and z being the vertical direction, and the fourth column indicates anisotropy sensitivity where "only" indicates the most sensitive components and "both (predominately)" indicates other components that are also "sensitive at least predominantly" to either horizontal resistivity $\rho_h$ or vertical resistivity $\rho_v$, as indicated, these being the electric, E, and magnetic, H, field components that are "sensitive at least predominantly," for the corresponding source type and receiver location, for purposes of this claim, whereas "theoretically=0" and "both (mixed $\rho_v$ and $\rho_h$)" indicate E and H components that are not "sensitive at least predominantly":

| Marine CSEM Data - EVTI Responses | | | |
|---|---|---|---|
| Source | Receiver Location | Data | $\rho_v/\rho_h$ Resistivity Sensitivity |
| HED | Online | $E_x$ | both (predominantly $\rho_v$) |
| " | " | $H_y$ | both (predominantly $\rho_v$) |
| " | " | $E_z$ | only $\rho_v$ |
| " | " | $E_y, H_x, H_z$ | are theoretically = 0 |
| HED | Offline | $E_x$ | both (predominantly $\rho_h$) |
| " | " | $H_y$ | both (predominantly $\rho_h$) |
| " | " | $H_z$ | only $\rho_h$ |
| " | " | $E_y, E_z, H_x$ | both (mixed $\rho_v$ and $\rho_h$) |
| HMD | Online | $E_y$ | both (predominantly $\rho_h$) |
| " | " | $H_x$ | both (predominantly $\rho_h$) |
| " | " | $H_z$ | only $\rho_h$ |
| " | " | $E_x, E_z, H_y$ | are theoretically = 0 |
| HMD | Offline | $E_y$ | both (predominantly $\rho_v$) |
| " | " | $H_x$ | both (predominantly $\rho_v$) |
| " | " | $E_z$ | only $\rho_v$ |
| " | " | $E_x, H_y, H_z$ | both (mixed $\rho_v$ and $\rho_h$). |

25. The method of claim 1, wherein a total of two of the six electromagnetic field components are selected in (a) and used in (b).

26. The method of claim 1, wherein a total of three of the six electromagnetic field components are selected in (a) and used in (b).

27. The method of claim 1, wherein a total of four of the six electromagnetic field components are selected in (a) and used in (b).

28. The method of claim 1, wherein a total of five of the six electromagnetic field components are selected in (a) and used in (b).

29. A computer-implemented method for determining earth vertical electrical anisotropy from an electromagnetic survey of a subsurface region located below the water bottom in an offshore environment, said survey using an electromagnetic source and a plurality of electromagnetic receivers, said method comprising:

(a) obtaining electromagnetic field data at a plurality of online and offline receiver locations from the survey's results, said data consisting only of electromagnetic field components that are selected because they are, for said electromagnetic source's design type and depending upon whether measured at an online receiver or an offline receiver, sensitive at least predominantly to vertical resistivity or sensitive at least predominantly to horizontal resistivity, with a requirement that the electromagnetic data obtained include at least one electromagnetic field component measured at an online receiver and at least one electromagnetic field component measured at an offline receiver, and a further requirement that the electromagnetic data obtained include at least one field component sensitive at least predominantly to vertical resistivity and one field component sensitive at least predominantly to horizontal resistivity, wherein the terms online and offline are defined with respect to a survey line of electromagnetic source positions, called a source line;

(b) solving Maxwell's electromagnetic field equations for horizontal resistivity and vertical resistivity at an (x,y,z) position in the subsurface region, using survey acquisition parameters and said obtained electromagnetic field data; and (c) obtaining a measure of vertical electrical anisotropy at location (x,y,z) from the calculated horizontal and vertical resistivities.

30. The method of claim 29, wherein the electromagnetic source is either a horizontal electric dipole ("HED") or a horizontal magnetic dipole ("HMD") and the field component sensitive at least predominantly to vertical resistivity and the field component sensitive at least predominantly to horizontal resistivity are selected from the following table, where the first column indicates source type, the second column receiver location, the third column electromagnetic field component(s) with the source line defining the x-direction and z being the vertical direction, and the fourth column indicates anisotropy sensitivity where "only" indicates the most sensitive components and "both (predominately)" indicates other components that are also "sensitive at least predominantly" to either horizontal resistivity $\rho_h$ or vertical resistivity $\rho_v$, as indicated, these being the electric, E, and magnetic, H, field components that are "sensitive at least predominantly," for the corresponding source type and receiver location, for purposes of this claim, whereas "theoretically=0" and "both (mixed $\rho_v$ and $\rho_h$)" indicate E and H components that are not "sensitive at least predominantly":

| Marine CSEM Data - EVTI Responses | | | |
|---|---|---|---|
| Source | Receiver Location | Data | $\rho_v/\rho_h$ Resistivity Sensitivity |
| HED | Online | $E_x$ | both (predominantly $\rho_v$) |
| " | " | $H_y$ | both (predominantly $\rho_v$) |
| " | " | $E_z$ | only $\rho_v$ |
| " | " | $E_y, H_x, H_z$ | are theoretically = 0 |
| HED | Offline | $E_x$ | both (predominantly $\rho_h$) |
| " | " | $H_y$ | both (predominantly $\rho_h$) |
| " | " | $H_z$ | only $\rho_h$ |
| " | " | $E_y, E_z, H_x$ | both (mixed $\rho_v$ and $\rho_h$) |
| HMD | Online | $E_y$ | both (predominantly $\rho_h$) |
| " | " | $H_x$ | both (predominantly $\rho_h$) |
| " | " | $H_z$ | only $\rho_h$ |
| " | " | $E_x, E_z, H_y$ | are theoretically = 0 |
| HMD | Offline | $E_y$ | both (predominantly $\rho_v$) |
| " | " | $H_x$ | both (predominantly $\rho_v$) |
| " | " | $E_z$ | only $\rho_v$ |
| " | " | $E_x, H_y, H_z$ | both (mixed $\rho_v$ and $\rho_h$). |

* * * * *